United States Patent [19]
Perret et al.

[11] Patent Number: 5,919,865
[45] Date of Patent: Jul. 6, 1999

[54] COMPOSITIONS BASED ON A HIGH-IMPACT POLYAMIDE

[75] Inventors: Patrice Perret, Serquigny; Alain Bouilloux, Bernay, both of France

[73] Assignee: Elf Atochem S.A., France

[21] Appl. No.: 08/899,271

[22] Filed: Jul. 23, 1997

[30] Foreign Application Priority Data

Jul. 23, 1996 [FR] France ................................. 96 09238

[51] Int. Cl.⁶ .................................................. C08L 77/00
[52] U.S. Cl. ........................................... 525/183; 525/179
[58] Field of Search ............................................. 525/183

[56] References Cited

U.S. PATENT DOCUMENTS

| | | | |
|---|---|---|---|
| 4,174,358 | 11/1979 | Epstein ..................... | 525/183 |
| 4,554,320 | 11/1985 | Reimann et al. ........... | 525/183 |
| 5,070,145 | 12/1991 | Guerdoux .................. | 525/179 |

FOREIGN PATENT DOCUMENTS 096264  12/1983  European Pat. Off. .
186790  7/1986  European Pat. Off. .

OTHER PUBLICATIONS

French Search Report dated Apr. 7, 1997.

*Primary Examiner*—Ana Woodward
*Attorney, Agent, or Firm*—Bell, Boyd & Lloyd

[57] ABSTRACT

The invention relates to compositions including at least one polyamide (A) and at least one copolymer (B) of ethylene and of at least one unsaturated carboxylic anhydride or acid, such that the impact/fluidity (IF) value of the compositions including 90 parts of (A) per 10 parts of (B) is higher than 1.5 in the case of the compositions containing essentially no glass fibres and such that the IF value of the compositions including 60 parts of (A) per 10 parts of (B) and of glass fibres is higher than 0.9; the IF value is defined as the ratio of the product (i) of the Izod notched impact at 23° C. multiplied by the MFI (Melt Flow Index) of the composition including (A) and (B) to the product (ii) of the impact multiplied by the MFI of the same composition but not including (B).

9 Claims, No Drawings

COMPOSITIONS BASED ON A HIGH-IMPACT POLYAMIDE

FIELD OF THE INVENTION

The present invention relates to compositions based on high-impact polyamide; it relates more particularly to compositions including at least one polyamide (A) and at least one copolymer (B) of ethylene and of at least one unsaturated carboxylic anhydride or acid, such that the impact/fluidity value of compositions including 90 parts of (A) per 10 parts of (B) is higher than 1.5 for compositions containing essentially no glass fibres and such that the impact/fluidity value of compositions including 60 parts of (A) per 10 parts of (B) and glass fibres is higher than 0.9.

BACKGROUND OF THE INVENTION

The impact/fluidity (IF) value is defined as the ratio of the product (i) of the Izod notched impact at 23° C. multiplied by the MFI (Melt Flow Index) of the composition including (A) and (B) to the product (ii) of the impact multiplied by the MFI of the same composition but not including (B).

This IF value can be obtained by a choice of the proportions of (A) and (B) and of the quantity of anhydride or acid in the copolymer (B), as will be explained later.

Improvement in the impact strength of polyamides is generally obtained by incorporation, in the form of a disperse phase, of an impact modifier which is elastomeric in character and has reactive functional groups (acrylic acid, maleic anhydride, etc.) capable of reacting with functional groups of the polyamide matrix. This reactivity makes it possible to ensure a fine and homogeneous dispersion of the elastomer, and good adhesion at the nodule/matrix interface, but results in a considerable drop in fluidity. This large change in the viscosity is detrimental to the processing, especially in the case of injection-moulded articles which are thin or large-sized.

The prior art has already described high-impact compositions based on polyamide.

EP 96 264 describes polyamides of viscosity between 2.5 and 5, reinforced with ethylene/$C_2$–$C_8$ alkyl (meth)acrylate/unsaturated acid or anhydride copolymers including 0.5 to 8% by weight of acid or anhydride; the examples show only the content of 4%.

U.S. Pat. No. 5,070,145 describes polyamides reinforced with a mixture (i) of a polyethylene or of an ethylene/alkyl (meth)acrylate copolymer and (ii) of an ethylene/alkyl (meth)acrylate/maleic anhydride copolymer.

The copolymers employed contain 2.5 to 3% by weight of maleic anhydride.

U.S. Pat. No. 4,174,358 describes reinforced polyamides which are in the form of a polyamide matrix in which are dispersed nodules smaller than 1 μm which have a certain modulus which must also be a fraction of the modulus of the polyamide. Very many reinforcing agents are described, some containing epoxide functional groups. Most are polymers which have neutralized acid or anhydride functional groups or are mixtures based on EPDM.

All this prior art has exemplified only reinforcing agents which have acid or anhydride functional groups or EPDMs, and no mention is made of the viscosity of the reinforced polyamides. In the comparative examples of the present invention it will be seen that the behaviour of the modifiers of the prior art has nothing to do with those of the present invention.

In the examples, only test pieces of small dimensions (4×6×50 mm) are produced for performing the impact strength measurements.

It is clear that with such dimensions and in laboratory conditions the viscosity is of no importance.

The situation is completely different in the case of articles which are thin or of larger dimensions or else of complex shape, when these articles must be produced at industrial rates.

EP 186 790 describes polyamides 6 modified with ethylene/n-butyl acrylate/maleic anhydride copolymers containing less anhydride than the prior art, to avoid a large drop in the fluidity. The examples show anhydride values of 0.22% or 0.7% by weight of maleic anhydride. The quantity of copolymer is either 8.7 or 25 parts per 100 parts of polyamide (that is to say 8 or 20% of the polyamide modified with the copolymer).

DESCRIPTION OF THE INVENTION

Applicant has found that quantities of the copolymer (B) and anhydride or acid contents of the copolymer (B) exist which give more advantageous IF values.

The invention will now be defined in greater detail.

Polyamide is intended to mean the products of condensation:

of one or more amino acids such as aminocaproic, 7-aminoheptanoic, 11-aminoundecanoic and 12-aminododecanoic acids, of one or more lactams such as caprolactam, oenantholactam and lauryllactam;

of one or more salts or mixtures of diamines such as hexamethylenediamine, dodecamethylenediamine, meta-xylylenediamine, bis-p-aminocyclohexylmethane and trimethylhexamethylenediamine with diacids such as isophthalic, terephthalic, adipic, azelaic, suberic, sebacic and dodecanedicarboxylic acids or mixtures of some of these monomers, which produce copolyamides.

For example, the condensation of caprolactam and of lauryllactam produces PA-6/12. The invention advantageously relates to PA-6 (polycaprolactam), PA-6,6 (polyhexamethylene adipamide), PA-11 (polyaminoundecanoic acid), PA-12 (polylauryllactam) and PA-6/12. It is more particularly useful in the case of PA-6 and PA-6,6.

The copolymer (B) of ethylene and of an unsaturated carboxylic anhydride or acid can be obtained by copolymerization with ethylene or by grafting onto polyethylene. The grafting may be performed in solvent phase or on molten polyethylene in the presence of a peroxide. These grafting techniques are known in themselves. As for the copolymerization of ethylene and of an unsaturated carboxylic anhydride or acid, so-called radical polymerization processes can be employed, which usually operate at pressures between 200 and 2500 bars.

Examples of unsaturated carboxylic acids are those containing 2 to 20 carbon atoms, such as acrylic, methacrylic, maleic, fumaric and itaconic acids and their anhydrides.

Examples of unsaturated carboxylic acids are those containing 2 to 20 carbon atoms such as acrylic, methacrylic, maleic, fumaric and itaconic acids.

Unsaturated dicarboxylic acids containing 4 to 10 carbon atoms and their anhydrides are monomers which are particularly preferred.

These monomers include, for example, maleic, fumaric, itaconic, citraconic, allylsuccinic, 4-cyclohexene-1,2-dicarboxylic, 4-methyl-4-cyclohexene1,2-dicarboxylic, bicyclo[2.2.1]hept-5-ene-2,3dicarboxylic and x-methylbicyclo[2.2.1]hept-5-ene-2,3dicarboxylic acids and maleic, itaconic, citraconic, allylsuccinic, 4-cyclohexene-1, 2-dicarboxylic, 4-methyl-4-cyclohexene-1,2-dicarboxylic, bicyclo[2.2.1]hept-5-ene-2,3-dicarboxylic and x-methylbicyclo[2.2.1]hept-5-ene-2,2-dicarboxylic anhydrides.

The monomer is advantageously (meth)acrylic acid or maleic anhydride. With regard to the copolymers (B) in which the unsaturated carboxylic anhydride or acid is polymerized, the copolymer (B) may include monomers other than ethylene, which can be chosen, for example, from:

alpha-olefins such as propylene, 1-butene or hexene vinyl esters of saturated carboxylic acids, such as vinyl acetate or vinyl propionate esters of unsaturated carboxylic acids such as alkyl (meth) acrylates which may contain up to 24 carbons.

With regard to the copolymers (B) in which the unsaturated carboxylic acid or anhydride is grafted, these are polyethylene homo- or copolymers as well as elastomers containing ethylene.

By way of example, it is possible to graft on the following polymers:

polyethylene, copolymers of ethylene and of an alpha-olefin, polyethylenes such as VLDPE (very low density PE), ULDPE (ultra low density PE) or metallocene PE;

copolymers of ethylene and of at least one vinyl ester of a saturated carboxylic acid, such as vinyl acetate or vinyl propionate;

copolymers of ethylene and of at least one ester of an unsaturated carboxylic acid, such as alkyl (meth) acrylates which may have up to 24 carbons;

EPR (ethylene/propylene rubber) or EPDM (ethylene/propylene/diene) elastomers;

mixtures of polymers chosen from the above.

The quantity of anhydride or acid in the copolymer (B) may vary within wide limits, provided that the values of the impact/fluidity value are obeyed. This quantity is advantageously at most 0.5% by weight and preferably between 0.1 and 0.5%. These values are given merely to illustrate the invention; it is preferred to employ the IF value which takes into account the anhydride content of (B) and the proportion of (B) in (A).

The copolymer (B) is advantageously an ethylene/alkyl (meth)acrylate/unsaturated carboxylic acid or anhydride copolymer.

Advantageously it may contain up to 40% by weight of alkyl (meth)acrylate and up to 0.5% by weight of anhydride or acid, preferably 0.2 to 0.4%.

The alkyl (meth)acrylate is advantageously chosen from methyl (meth)acrylate, ethyl acrylate, n-butyl acrylate, isobutyl acrylate and 2-ethylhexyl acrylate.

The quantity of alkyl (meth)acrylate is advantageously from 20 to 35%.

This copolymer can be obtained by radical polymerization of the monomers at high pressure such as 200 to 3000 bars.

Its MFI may be between 0.5 and 50 (at 190° C. under 2.16 kg).

The impact fluidity value is the ratio:

$$IF\ value = \frac{[\text{notched Izod impact at } 23°\text{C.} \times MFI] \text{ of the composition including } A \text{ and } B}{[\text{notched Izod impact at } 23°\text{C.} \times MFI] \text{ of the same composition but not including } (B)}$$

The composition which appears in the denominator is the composition without the impact modifier (B) but containing the same optional additives as the reinforced composition. For example, if it is a question of reinforcing compositions based on polyamide (A) and glass fibres, the composition which appears in the numerator of the IF contains (A), (B) and glass fibres, and the composition which appears in the denominator contains (A) and glass fibres.

The MFI is measured according to ISO standard 1133 under a 2.16 kg weight. The temperature of measurement varies depending on the types of polyamides; to give an example, it is 235° C. for PA-6 and 275° C. for PA-6,6. The compositions of the invention may contain antioxidants, UV stabilisers, fillers, flame retardants and the like. In particular, they may contain glass fibres. The quantity of these fibres may be up to 40 parts per 60 parts of (A) and advantageously 30 parts per 70 parts of (A).

Applicant Company has discovered that the IF value of the compositions of the invention and its variations is very different from that of the prior art.

This value is higher than that of the compositions including (A) and (B) in which the anhydride or acid content of (B) is higher. If the content is too low, for example lower than 0.1% by weight, a sufficient impact strength cannot be obtained; if it is above 0.7 or 0.9%, then there is a large decrease in the MFI without the impact strength being improved.

Applicant has also discovered that it is not necessary to employ large proportions of (B). A certain quantity thereof is needed, otherwise the properties are not improved. This low value is approximately 10 parts of (B) per 90 parts of the total of (A) and of the optional fibres, without this value being strict; this value should be understood as capable of being 9 or 11. This minimum quantity of (B) and the anhydride or acid contents of (B) which were mentioned above serve merely to guide a person skilled in the art in preparing the compositions of the invention. The Applicant Company prefers to employ the IF value because it expresses the effect of (B) better, both according to its quantity and according to its anhydride (or acid) content.

According to an advantageous form, the present invention also relates to compositions such that the impact fluidity value of the compositions including from 90 to 80 parts of (A) per 10 and 20 parts of (B) respectively, and containing essentially no glass fibres, remains higher than 1.5 and those such that the impact fluidity value of the compositions including from 60 to 50 parts of (A) per 10 and 20 parts of (B) respectively, as well as glass fibres, remains higher than 0.9.

For example, in the case of PA-6 including essentially no glass fibres and in the case of anhydride-rich contents of (B) such as 0.8 and 1.5%, the IF value passes through a minimum when the quantity of (B) varies from 10 to 20 per 90 and 80 parts of (A) respectively, whereas in the present invention the IF value passes through a maximum in the case of 15 parts of (B) in (85) parts of (A).

With regard to PA-6,6 including essentially no glass fibres and in the case of anhydride-rich contents of (B) such as 0.8 and 1.5%, the IF value, which is low, decreases or passes through a maximum when (B) varies from (10) to (20) parts per 90 and 80 parts of (A) respectively. On the other hand, in the present invention, the IF value is much higher and increases slightly in the case of values of (B) varying from (10) to (20) parts per 90 and 80 parts of (A) respectively.

Thus, in the case of polyamides which are essentially not filled with glass fibre, it is not necessary to employ large quantities of (B); quantities of approximately between 10 and 15 per 90 and 85 parts of (A) respectively suffice. This value of 15 is not a strict value and must be understood as capable of being 14 or 16 or even 17.

All this is absolutely neither described nor suggested in the prior art EP 186 790. This prior art in examples 4 and 5 shows anhydride contents of (B) of 0.22 and 0.7% by weight respectively as being equivalent, whereas the Applicant Company has shown (see example and comparative example of the present application below) that values of 0.35% (according to the present invention) and of 0.8% (very close to the 0.7% of EP 186 790) have nothing in common. Furthermore, EP 186 790 has shown only mixtures of PA-6 containing 25 parts of (B) per 100 parts of PA-6, (B) having anhydride contents of 0.22 and 0.7% by weight, or mixtures of 100 parts of PA-6 with 8.7 parts of (B) which has an anhydride content of 0.22% by weight.

In the case of quantities of (B) which are so small there is no significant improvement in the impact; this is furthermore why the example does not show the impact values.

This prior art absolutely does not cite the impact/fluidity value; it also does not mention anything about polyamides reinforced with glass fibres. The Applicant Company has also discovered that in the case of PA-6 filled with glass fibres and in the case of anhydride-rich contents of (B) such as 1.5% the IF value decreases when the quantity of (B) increases from 10 to 15 parts per 60 and 55 parts of (A) respectively or 90 and 85 parts of the total (A) and fibres, whereas in the present invention the value is slightly improved and increases very slightly when the quantity of (B) changes from 10 to 15 per 60 and 55 parts of (A) respectively or 90 and 85 parts of the total (A) and fibres.

As for PA-6,6 filled with glass fibres, the IF value is nearly doubled when a copolymer (B) rich in maleic anhydride such as 1.5% is changed to a copolymer according to the present invention. Thus, in the case of polyamides filled with glass fibres, it is not necessary to employ large quantities of (B); it is possible to take the same values already mentioned above in the case of polyamides which are essentially not filled with glass fibres, that is to say 10 to 15 parts of (B) per 60 to 55 parts of (A) respectively or 90 and 85 parts of the total (A) and fibres.

As above, the value 15 must not be understood as being a strict value.

These compositions of the invention are prepared by the techniques usually employed for thermoplastics, such as extrusion or twin-screw mixers.

Advantageously the polyamide (A) is introduced into the feed hopper, the optional glass fibres into the melt zone and then the copolymer (B) into the melt zone after the optional introduction of the glass fibres. The Applicant Company has found that this process gives a better IF value than if the polyamide (A) and the copolymer (B) are introduced into the hopper and then the optional glass fibres into the melt zone.

The present invention also relates to injection-moulded articles, in particular articles which are thin and large-sized, produced with the compositions which have just been described.

The present invention also relates to compositions including at least one polyamide (A), at least one copolymer (B) of ethylene and of at least one unsaturated carboxylic anhydride or acid and optionally glass fibres, such that:

the quantity of (B) is between 10 and 15 parts per 90 and 85 parts respectively of the total of (A) and of the optional fibres, the quantity of anhydride (or of acid) of (B) is from 0.1 to 0.5% by weight of (B) preferably 0.2 to 0.4%.

(A) and (B) have been defined above.

(B) is advantageously an ethylene/alkyl (meth)acrylate/unsaturated carboxylic anhydride or acid copolymer as defined above. The various components of the invention, the preferred qualities and the preferred quantities are the same as already described above.

EXAMPLES

COMPOUNDING

The compositions are obtained by compounding on a Werner ø 40, L/D 40 twin-screw extruder equipped with a degassing system and a lace-cutter, with a throughput of 40 kg/h and a speed of 150 revolutions/min. The temperature profiles employed are the following:

|  | UNREINFORCED | REINFORCED |
|---|---|---|
| Base PA 6 | 240/240/250/250° C. | 260/260/260/260° C. |
| Base PA 6,6 | 260/265/265/265° C. | 270/275/275/275° C. |

In the case of the unreinforced formulations the components, in granulate form, are mixed dry and then introduced into the feed hopper. In the presence of glass fibre the process employed is: introduction of the PA into hoppers and, successively, of the reinforcement and of the modifier into the melt zone.

MOULDING OF THE SAMPLES

The granulates are dried at reduced pressure at a temperature of 80° C. and are then injection-moulded on a Krauss Maffei B1 type injection press (60 t closure) in the following conditions:

| | |
|---|---|
| Unreinforced PA 6 base | Stock temperature 230–260° C., mould 50° C. Injection pressure 45 bars |
| Glass fibre reinforced PA 6 base | Stock temperature 260–280° C., mould 60° C. Injection pressure 200 bars |
| Unreinforced PA 66 base | Stock temperature 250–280° C., mould 80° C. Injection pressure 70 bars |
| Glass fibre reinforced PA 6 6 base | Stock temperature 250–260° C., mould 80° C. Injection pressure 200 bars |

The standardized test pieces (80×10×4 mm$^3$) thus obtained are conditioned for 14 days at 23° C. and 50% relative humidity.

Evaluation

Flexural modulus according to ISO standard 178

Impact strength on previously notched test pieces of the Charpy type according to ISO standard 179-93 and of the Izod type according to ISO standard 180, at various temperatures (23° C., −20° C., −40° C.). When the crack runs across less than 90% of the thickness at the notch bottom of the test piece, the reference "no break" is marked with an asterisk (*).

Melt index (MFI) according to ISO standard 1133 under a 2.16 kg weight and at temperatures of 235° C. and 275° C. for compositions based on PA 6 and PA 66 respectively.

Raw materials

The polyamides tested are polyamides 6 and 66 respectively, marketed by BASF under references Ultramid B3 and A3. The glass fibre employed is from P327 Vetrotex.

The terpolymers tested are:

TERPO 1 ethylene/ethyl acrylate/maleic anhydride terpolymer 68.5/30/1.5% by weight, MFI (190° C., 2.16 kg)=7

TERPO 2 ethylene/ethyl acrylate/maleic anhydride terpolymer 64.1/35/0.8% by weight, MFI (190° C., 2.16 kg)=7

TERPO 3 ethylene/ethyl acrylate/maleic anhydride terpolymer 69.7/30/0.35% by weight, MFI (190° C., 2.16 kg)=7

Unreinforced PA 6 formulations

Comparative examples 1 to 6

Modifier content 10 to 20%

Terpos 1 and 2 allow the impact strength to be improved when the modifier content is between 10 and 20%, but with a large decrease in the MFI.

Examples according to the invention 1-2-3

On the other hand, Terpo 3 makes it possible to obtain superior impact strength and fluidity simultaneously.

The results appear in Table 1.

Unreinforced PA 66 formulations

Comparative examples 7 to 12

Modifier content 10 to 20%

Terpos 1, 2 allow the impact strength to be improved appreciably at the cost of the fluidity.

Examples according to the invention 4-5-6

Terpo 3 makes it possible to obtain moderate impact strengths, inferior to Terpos 1–2, but with an excellent fluidity, resulting in a better impact/fluidity compromise.

The results appear in Table 2.

Reinforced PA 6 and 66 formulations

The compounding process employed is:
introduction of the PA into hoppers
introduction of the glass fibre into melt zone
introduction of the impact modifier into melt zone after that of the glass fibre Comparative examples 13 to 16

The introduction of 10–15% of highly reactive Terpo 1 within a PA+30% GF enables the impact strengths to be appreciably improved but with a decrease in the MFI.

Examples 7 to 10

The use of weakly reactive Terpo 3 allows similar impact levels to be preserved while improving the fluidity of the reinforced compounds when compared with Terpo 1.

The results appear in Tables 3 and 4.

TABLE 1

(PA-6)

| Examples | Composition PA 6 | Notched Izod impact KJ/m² ISO 180 | | | Notched Charpy impact kJ/m² ISO 179-93 | | | Flexural modulus MPa ISO 178-93 | MFI g/10 | IF value |
| --- | --- | --- | --- | --- | --- | --- | --- | --- | --- | --- |
| | | 23° C. 8 | -20° C. 6 | -40° C. 5 | 23° C. 8 | -20° C. 5 | -40° C. 3 | 1970 | min 21 | 1 |
| Comp. Ex. 1 | PA 6 + 10% TERPO 1 | 17 | 7 | 6 | 20 | 8 | 6 | 1170 | 9.5 | 0.96 |
| Comp. Ex. 2 | PA 6 + 15% TERPO 1 | 18 | 9 | 7 | 24 | 10 | 7 | 1010 | 7.8 | 0.93 |
| Comp. Ex. 3 | PA 6 + 20% TERPO 1 | 30 | 14 | 7 | 34* | 11 | 7 | 860 | 5.9 | 1.05 |
| Ex. 1 | PA 6 + 10% TERPO 3 | 18 | 8 | 6 | 20 | 8 | 6 | 1230 | 15 | 1.61 |
| Ex. 2 | PA 6 + 15% TERPO 3 | 39* | 10 | 8 | 45* | 10 | 7 | 1060 | 11.4 | 2.64 |
| Ex. 3 | PA 6 + 20% TERPO 3 | 44* | 13 | 9 | 60* | 13 | 10 | 910 | 8.9 | 2.32 |
| Comp. Ex. 4 | PA 6 + 10% TERPO 2 | 17 | 7 | 5 | 20 | 8 | 6 | 1730 | 9.5 | 0.96 |
| Comp. Ex. 5 | PA 6 + 15% TERPO 2 | 18 | 9 | 6 | 30 | 10 | 7 | 1500 | 6.3 | 0.67 |
| Comp. Ex. 6 | PA 6 + 20% TERPO 2 | 35* | 11 | 8 | 40 | 11 | 8 | 1190 | 5.4 | 1.12 |

*No Break

TABLE 2

(PA-6,6)

| Examples | Composition PA 6 | Notched Izod impact KJ/m² ISO 180 | | | Notched Charpy impact kJ/m² ISO 179-93 | | | Flexural modulus MPa ISO 178-93 | MFI g/10 min | IF value |
| --- | --- | --- | --- | --- | --- | --- | --- | --- | --- | --- |
| | | 23° C. 8 | -20° C. 6 | -40° C. 5 | 23° C. 8 | -20° C. 3 | -40° C. 3 | 2590 | 50 | 1 |
| Comp. Ex. 7 | PA 66 + 10% TERPO 1 | 18 | 10 | 7 | 19 | 7 | 6 | 1650 | 36 | 1.44 |
| Comp. Ex. 8 | PA 66 + 15% TERPO 1 | 55* | 14 | 10 | 28 | 8 | 7 | 1410 | 13 | 1.3 |

TABLE 2-continued

(PA-6,6)

| Examples | Composition PA 6 | Notched Izod impact KJ/m² ISO 180 | | | Notched Charpy impact kJ/m² ISO 179-93 | | | Flexural modulus MPa ISO 178-93 | MFI g/10 min | IF value |
|---|---|---|---|---|---|---|---|---|---|---|
| | | 23° C. 8 | −20° C. 6 | −40° C. 5 | 23° C. 8 | −20° C. 3 | −40° C. 3 | 2590 | 50 | 1 |
| Comp. Ex. 9 | PA 66 + 20% TERPO 1 | 71* | 15 | 12 | 75* | 12 | 7 | 1210 | 3.3 | 0.58 |
| Ex. 4 | PA 66 + 10% TERPO 3 | 17 | 10 | 7.5 | 18 | 9 | 8 | 1680 | 41 | 1.74 |
| Ex. 5 | PA 66 + 15% TERPO 3 | 20 | 12 | 9 | 22 | 11 | 8 | 1510 | 37 | 1.85 |
| Ex. 6 | PA 66 + 20% TERPO 3 | 33* | 12 | 9 | 27 | 12 | 10 | 1318 | 24 | 1.98 |
| Comp. Ex. 10 | PA 66 + 10% TERPO 2 | 17 | 7 | 5 | 20 | 8 | 6 | 1980 | 20 | 0.85 |
| Comp. Ex. 11 | PA 66 + 15% TERPO 2 | 16 | 9 | 6 | 30 | 10 | 7 | 1678 | 15 | 0.60 |
| Comp. Ex. 12 | PA 66 + 20% TERPO 2 | 50* | 11 | 8 | 40 | 11 | 8 | 1500 | 4.5 | 0.56 |

*No break

TABLE 3

(PA-6 + glass fibres)

| Examples | Composition PA 66 + 30% GF | Notched Izod impact KJ/m² ISO 180 | | | Notched Charpy impact kJ/m² ISO 179-93 | | | Flexural modulus MPa ISO 178-93 | MFI g/10 min | IF value |
|---|---|---|---|---|---|---|---|---|---|---|
| | | 23° C. 17 | −20° C. 13 | −40° C. — | 23° C. 12 | −20° C. 9 | −40° C. — | 5420 | 6.9 | 1 |
| Comp. Ex. 1 | PA 6 + 30% GF + 10% TERPO 1 | 26 | 16 | — | 21 | 13 | — | 4140 | 4.3 | 0.88 |
| Comp. Ex. 14 | PA 6 + 30% GF + 15% TERPO 1 | 28 | 16 | — | 22 | 13 | — | 4470 | 3.6 | 0.86 |
| Ex. 7 | PA 6 + 30% GF + 10% TERPO 3 | 22 | 15 | — | 18 | 11 | — | 3980 | 4.8 | 0.90 |
| Ex. 8 | PA 6 + 30% GF + 15% TERPO 3 | 24 | 17 | — | 20 | 12 | — | 3820 | 4.6 | 0.94 |

*No break

TABLE 4

(PA-6,6 + Glass fibres)

| Examples | Composition PA 66 + 30% GF | Notched Izod impact KJ/m² ISO 180 | | | Notched Charpy impact kJ/m² ISO 179-93 | | | Flexural modulus MPa ISO 178-93 | MFI g/10 min | IF value |
|---|---|---|---|---|---|---|---|---|---|---|
| | | 23° C. 13 | −20° C. 11 | −40° C. — | 23° C. 10 | −20° C. 9 | −40° C. — | 6400 | 17 | 1 |
| Comp. Ex. 15 | PA 66 + 30% GF + 10% TERPO 1 | 19 | 13 | — | 14 | 11 | — | 5180 | 4 | 0.34 |
| Comp. Ex. 16 | PA 66 + 30% GF + 15% TERPO 1 | 19 | 14 | — | 17 | 11 | — | 5180 | 3 | 0.25 |
| Ex. 9 | PA 66 + 30% GF + 10% TERPO 3 | 18 | 13 | — | 15 | 10 | — | 4930 | 12 | 0.97 |
| Ex. 10 | PA 66 + 30% GF + 15% TERPO 3 | 21 | 15 | — | 18 | 11 | — | 4050 | 5 | 0.47 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Composition comprising:
    at least one polyamide (A) and at least one copolymer (B) of ethylene and of at least one unsaturated carboxylic anhydride or acid, and of optional glass fibers;
    the impact/fluidity (IF) value of the composition including 90 parts of (A) per 10 parts of (B) is greater than 1.5 for compositions containing no glass fibers and the IF value of the compositions including 60 parts of (A) per 10 parts of (B) and glass fibers is greater than 0.9; and
    the anhydride or acid content of (B) is between 0.1 and 0.4% by weight.

2. Composition according to claim 1, further comprising glass fibers in an amount of zero up to 40 parts per 60 parts of (A).

3. Composition according to claim 1, wherein the anhydride or the acid is selected from acrylic acid, methacrylic acid and maleic anhydride.

4. Composition according to claim 1, wherein (B) is an ethylene/alkyl (meth)acrylate/maleic anhydride copolymer.

5. Composition according to claim 1, wherein the quantity of (B) is between 10 and 15 parts per 90 and 85 parts respectively of the total made up of (A) and of the optional glass fibers.

6. Composition comprising at least one polyamide (A), at least one copolymer (B) of ethylene and at least one unsaturated carboxylic anhydride or acid and optionally fibers:
    the quantity of (B) is between 10 and 15 parts per 90 and 85 parts respectively of the total of (A) and of optional fibers,
    the quantity of anhydride or of acid of (B) is from 0.1 to 0.4% by weight of (B).

7. Composition according to claim 6, wherein (B) is an ethylene/alkyl (meth)acrylate/maleic anhydride copolymer.

8. Composition according to claim 2, wherein 30 parts of the glass fibers are present per 70 parts of (A).

9. Composition according to claim 6, wherein the quantity of anhydride or acid of (B) is from 0.2 to 0.4%.

* * * * *